No. 863,040. PATENTED AUG. 13, 1907.
A. McLEAN.
WHEEL.
APPLICATION FILED JULY 25, 1906.

WITNESSES
Linus Bohlin
Archworth Martin

INVENTOR
Alexander McLean
by attys
Lynnestvedt & Carpenter

UNITED STATES PATENT OFFICE

ALEXANDER McLEAN, OF BRAE SIDE, TI TREE POINT, NEW ZEALAND.

WHEEL.

No. 863,040.

Specification of Letters Patent.

Patented Aug. 13, 1907.

Application filed July 25, 1906. Serial No. 327,745.

*To all whom it may concern:*

Be it known that I, ALEXANDER McLEAN, a subject of His Majesty the King of Great Britain and Ireland, residing at Brae Side, Ti Tree Point, in the provincial district of Hawkes Bay, in the Colony of New Zealand, have invented certain new and useful Improvements in Wheels, of which the following is a specification.

My invention relates to wheels provided with pneumatic tires, and has for its objects; to provide a wheel of this type with an improved form of protective casing; to provide a wheel in which the tire clamps the protective casing or ring and the rim in their relative positions, and in which provision is made for preventing any slipping of the protective ring upon the ground; to provide a protective ring which shall be so constructed as to preserve the resiliency of the tire; and, to provide a rim and casing having an inexpensive and effective connecting means for preventing the collection of dirt and foreign matter between the rim and protective casing.

One form of my invention is illustrated in the accompanying drawing, in which—

Figure 1:
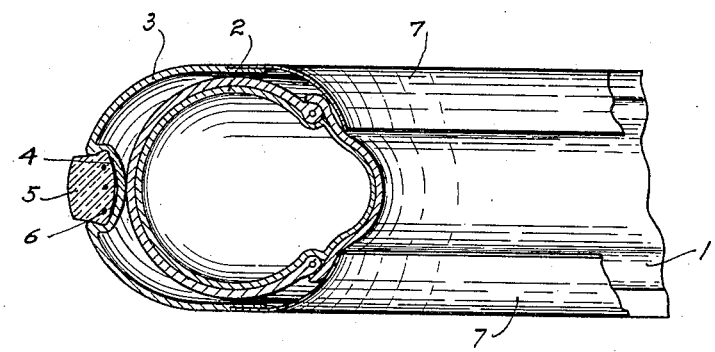
Figure 1 is a sectional perspective view of a portion of the wheel.

As shown in Figure 1 of the drawing, 1 is the rim of the wheel which may be of any preferred design, either of wood or metal; 2 is the pneumatic tire consisting of the usual outer covering, and the air-tight inner tube, 3 is the protective casing or ring, as it may be termed, which may be made of any resistant material, such as for instance, thin steel, and is provided at its center with an incurved recess 4 adapted to receive the tread 5, which tread will be ordinarily composed of rubber and retained in place by the shape of the recess 4, and also as shown in the present case, by means of embedded wires 6 extending circumferentially around the ring, and 7 are flexible connecting strips of leather, rubber or other suitable material, which are secured to the ring 3 and rim 1 by cement, rivets, or other similar connecting means. These strips 7 prevent dirt and other foreign matter from working in between the protective ring 3 and the tire 2, and by virtue of their flexibility permit the relative radial movement of the ring in the rim. The rubber tread 5 is essential to a successful device of this kind, for the reason that otherwise a resistant material such as that of which the ring 3 is composed would not grip the ground with sufficient security. The inturning of the portion 4 also performs a function other than of providing a recess for the tread 5, as such incurving of the portion 4 gives the ring 3 a bearing upon the tire at only one point, leaving the sides of such ring 3 free from the tire. This arrangement increases the resilient properties of the wheel, as the ring 3 because of its limited bearing upon the tire can move much more readily in a radial direction than if such ring touched the tire throughout a semicircumference as is ordinarily done in devices of this type. The diameter of the ring 3 is just enough greater than the diameter of the rim 1 to provide for the clamping of such parts in their relative position by the inflation of the tire. There will therefore be no rubbing of the ring 3 upon the outside of the tire, as is the case when the ring is considerably larger than the rim.

Figures 2, 3:
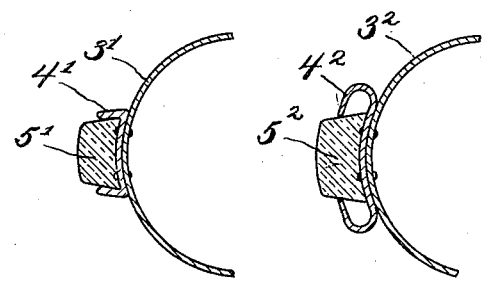
Figures 2 and 3 are sections through modified forms of protective rings.

Figure 2 shows a modified form of protective ring 3' which ring is provided with a separate retaining means 4' for securing the tread 5'. In this form the part 4' and the tread 5' are secured to the protective ring by means of rivets. Figure 3 shows still another form of retaining ring $3^2$ in which the member $4^2$ has its ends inturned to engage sides of the tread $5^2$.

It will be apparent that a number of modifications may be made in my construction, without departing from the spirit of the invention. The shape of the rim might be considerably modified without any change in function, and the type of tire changed. It will also be apparent that the shape of the recess 4 might be considerably modified as well as that of the tread 5. These and other modifications which will readily occur to those skilled in the art are comprehended in my invention and intended to be covered by the claims.

Having thus described my invention and illustrated its use, what I claim as new and desire to secure by Letters Patent, is the following:

In combination, a wheel comprising a rim, a pneumatic tire thereon, an independent protective ring parti-cylindrical in general transverse cross section but having an incurved central portion adapted to touch the center of the tire throughout its length, the inside diameter of the protecting ring at the incurved portion being substantially equal to the greatest diameter of the tire when inflated, and a tread seated in the incurved portion.

In testimony whereof I have hereunder signed my name in the presence of the two subscribed witnesses.

ALEXANDER McLEAN.

Witnesses:
 PAUL CARPENTER,
 PAUL WILLIAM REIZE.